(12) United States Patent
Lai (10) Patent No.: US 9,525,906 B2
(45) Date of Patent: Dec. 20, 2016

(54) DISPLAY DEVICE AND METHOD OF CONTROLLING THE DISPLAY DEVICE

(71) Applicant: HON HAI PRECISION INDUSTRY CO., LTD., New Taipei (TW)

(72) Inventor: Yung-Long Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 189 days.

(21) Appl. No.: 14/225,453

(22) Filed: Mar. 26, 2014

(65) Prior Publication Data

US 2014/0304736 A1    Oct. 9, 2014

(30) Foreign Application Priority Data

Apr. 8, 2013  (TW) .................................. 102112267

(51) Int. Cl.
*H04N 21/41* (2011.01)
*H04N 21/4223* (2011.01)
*H04N 21/422* (2011.01)

(52) U.S. Cl.
CPC ...... *H04N 21/4223* (2013.01); *H04N 21/4126* (2013.01); *H04N 21/42224* (2013.01); *H04N 21/4221* (2013.01)

(58) Field of Classification Search
None
See application file for complete search history.

(56) References Cited

U.S. PATENT DOCUMENTS

| 8,854,433 | B1* | 10/2014 | Rafii | G06F 3/017 348/42 |
| 2002/0057383 | A1* | 5/2002 | Iwamura | G08C 23/00 348/734 |
| 2002/0064382 | A1* | 5/2002 | Hildreth | G06K 9/00375 396/100 |
| 2002/0084929 | A1 | 7/2002 | Stefanik | |
| 2009/0259967 | A1* | 10/2009 | Davidson | G06F 3/0481 715/799 |
| 2011/0197161 | A1* | 8/2011 | Mattingly | G06F 3/0304 715/810 |
| 2012/0206345 | A1* | 8/2012 | Langridge | G06F 3/017 345/157 |
| 2014/0245230 | A1* | 8/2014 | Durham | G06F 3/0425 715/848 |

FOREIGN PATENT DOCUMENTS

| CN | 101807114 | 8/2010 |
| TW | 201237691 A1 | 9/2012 |

* cited by examiner

*Primary Examiner* — Ryan M Gray
(74) *Attorney, Agent, or Firm* — Zhigang Ma (57) ABSTRACT

A display device is connected in communication with a mobile electronic device. The display control device detects a movement information of a control object in a first two-dimensional space, and the mobile electronic device detects a movement information of the control object in a second two-dimensional space. The display control device works out at a current three-dimensional coordinates of the control object according to the movement information of the control object in the first two-dimensional space, and a movement information of the control object in the second two-dimensional space and the initial three-dimensional coordinates of the control object.

9 Claims, 10 Drawing Sheets

DISPLAY DEVICE AND METHOD OF CONTROLLING THE DISPLAY DEVICE

BACKGROUND

1. Technical Field

The disclosure relates to network communications, and particularly to a display device and a method of controlling the display device.

2. Description of Related Art

Smart TVs utilize human-computer interactions to control the Smart TV. Some Smart TVs can be controlled by gestures captured by a 3D camera of the Smart TV. However, 3D gesture detection requires complex algorithms or other optical instruments. A high resolution of the gestures is difficult to achieve.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The word "module" as used hereinafter, refers to logic embodied in hardware or firmware, or to a collection of software instructions, written in a programming language, such as, for example, JAVA, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
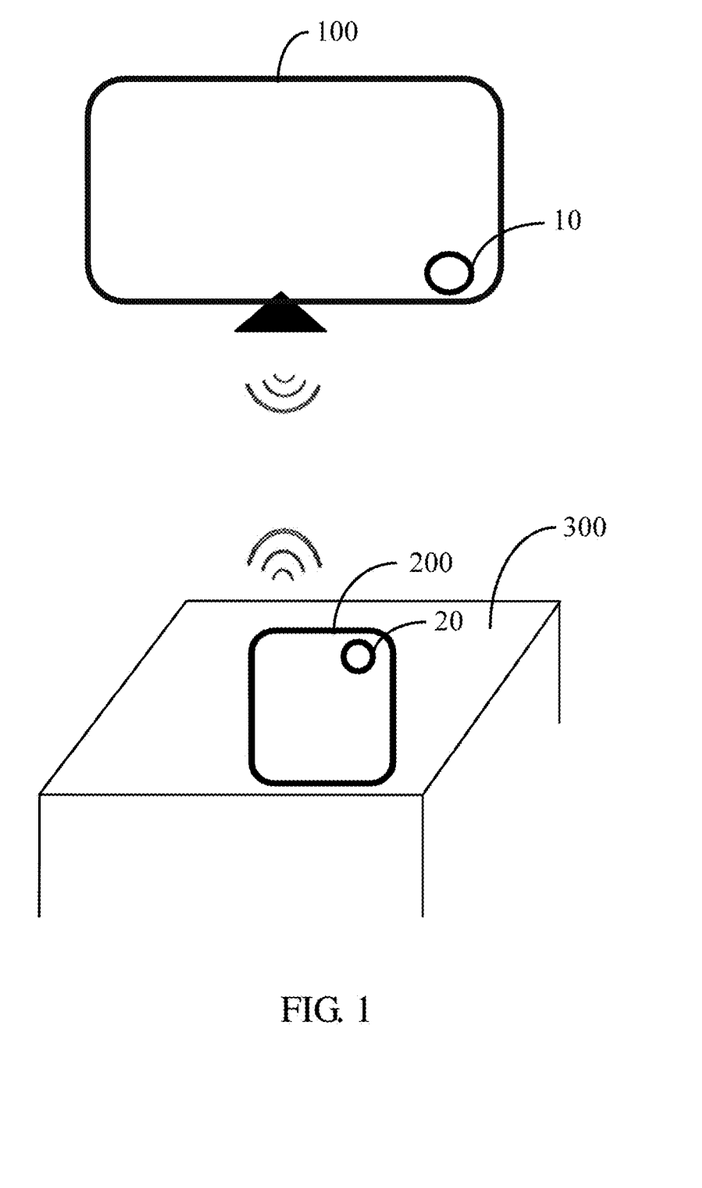
FIG. 1 is a schematic diagram of a display device and a mobile electronic device in communication with the display device.
Figure 2:
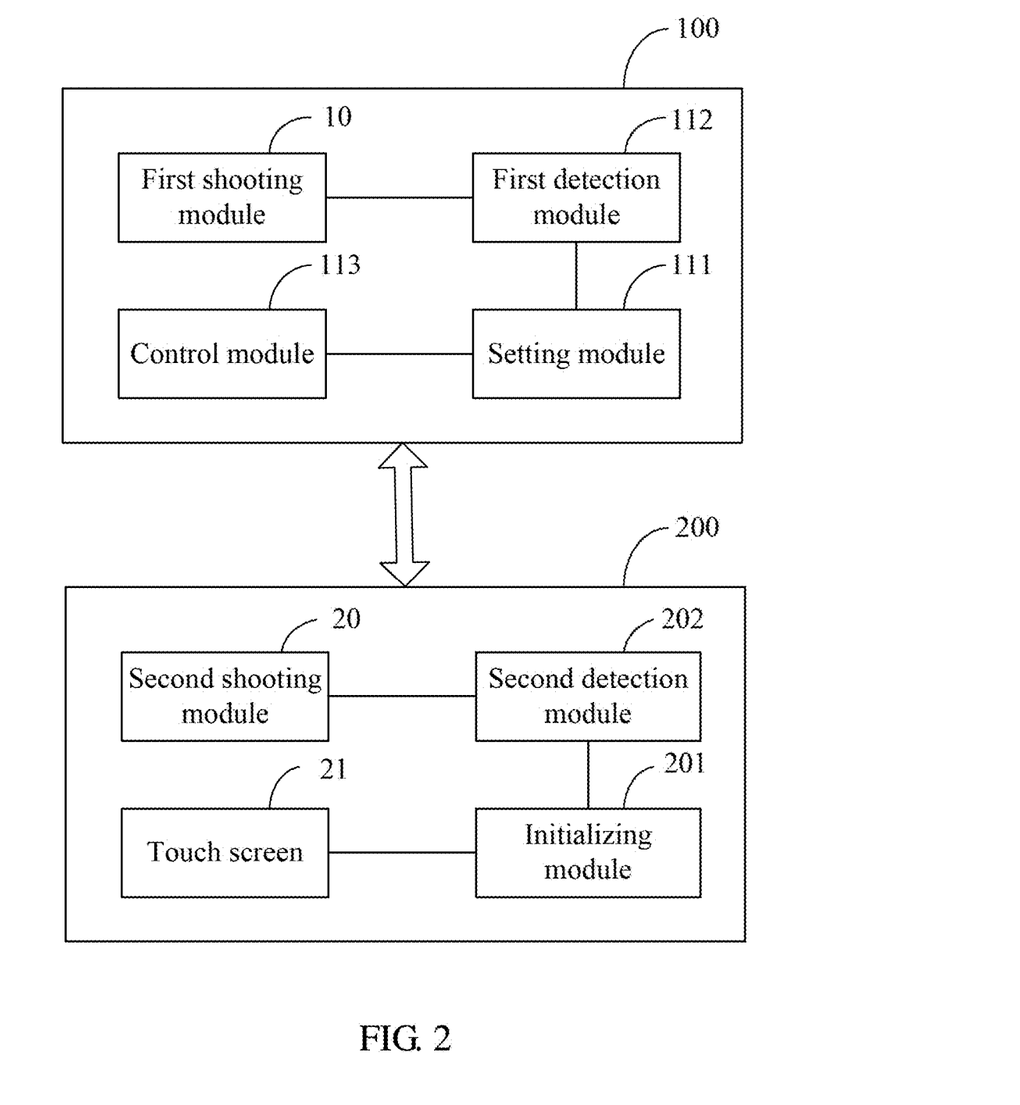
FIG. 2 is a function module diagram of one embodiment of the display device and the mobile electronic device of FIG. 1.

FIG. 1 is a schematic diagram of a display device 100 in communication with a mobile electronic device 200, and FIG. 2 is a function module diagram of one embodiment of the display device 100 and the mobile electronic device 200. The display device 100 can be a smart TV, a digital high-definition (HD) TV, or an Internet TV. The mobile electronic device 200 can be a tablet or a smart phone. In one embodiment, the display device 100 comprises a first shooting module 10, and the mobile electronic device 200 comprises a second shooting module 20. The first shooting module 10 and the second shooting module 20 can be an HD camera or an HD camcorder. The first shooting module 10 and the second shooting module 20 are used for recording a user's gestures, and for controlling the display device 100.

To facilitate operations of a user, the mobile electronic device 200 is placed on a horizontal support 300 in front of the display device 100. The display device 100 provides a graphical user interface (GUI) for operation by the user. The display device 100 can be in communication with the mobile electronic device 200 by Bluetooth, WIFI, ZigBee, or other suitable short-range wireless communication method to achieve data transfer.

The display device 100 further comprises a setting module 111, a first detection module 112, and a control module 113. The mobile electronic device 200 further comprises a touch screen 21, an initializing module 201, and a second detection module 202. The touch screen 21 can be a capacitive touch screen or a resistive touch screen. In one embodiment, the touch screen 21 is a capacitive touch screen.

Figure 3:
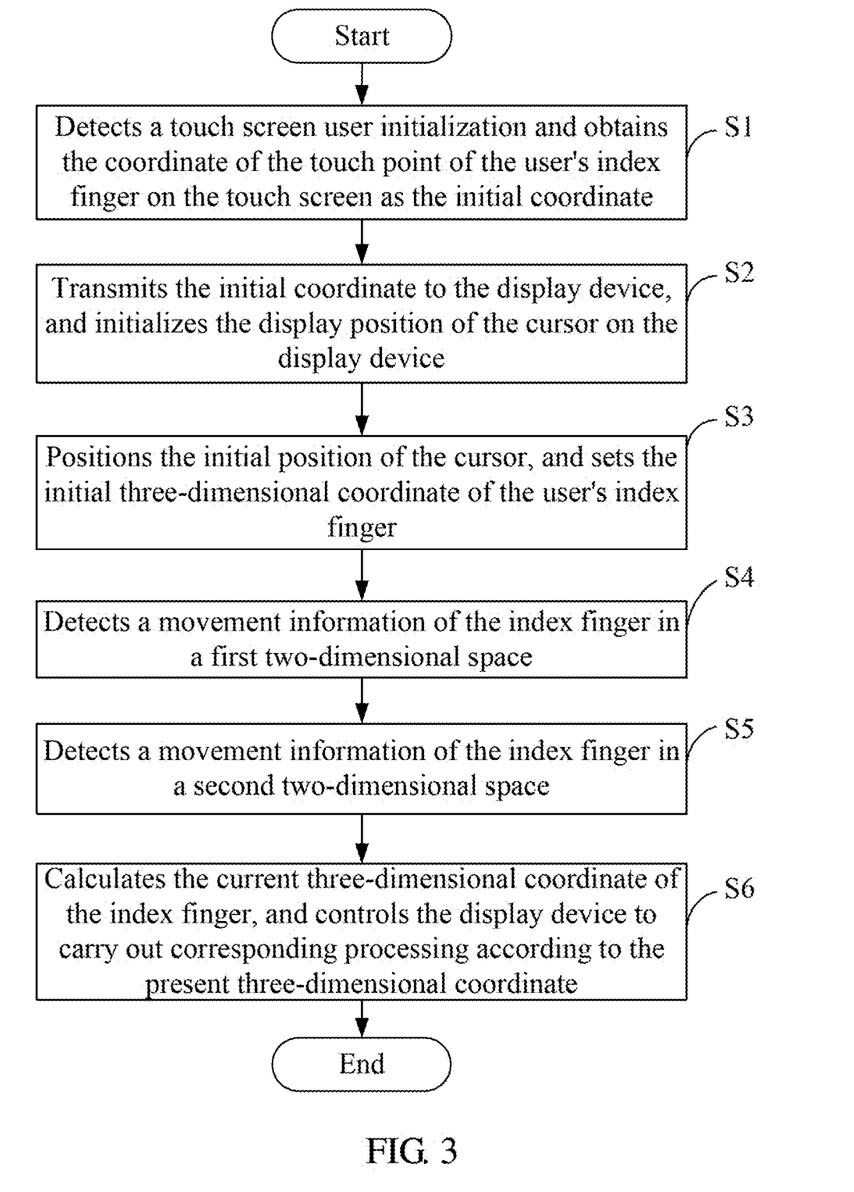
FIG. 3 is a general flowchart of one embodiment of a method of the mobile electronic device controlling the display device.

FIG. 3 is a general flowchart of one embodiment of a method of the mobile electronic device 200 for controlling the display device 100. In one embodiment, the user can make hand gestures in a shooting range of the first shooting module 10 and the second shooting module 20 to control the display device 100. For convenience of description, in one embodiment, the user uses an index finger to control the display device 100. In another embodiment, the user can use other fingers, a stylus, or a remote device to control the display device 100. Further, the method is not limited to the following steps, and the method can include only some of the steps described below.

In step S1, the initializing module 201 detects a user's initialization operation on the touch screen 21, and sets coordinates of a touch point of the initialization operation on the touch screen 21 as initial coordinates. In one embodiment, the initial touch operation is a multi-touch operation. For example, the multi-touch operation can be the palm of the user touching the touch screen 21. The initial coordinates of the touch point on the touch screen 21 is two-dimensional coordinates.

Figure 4:
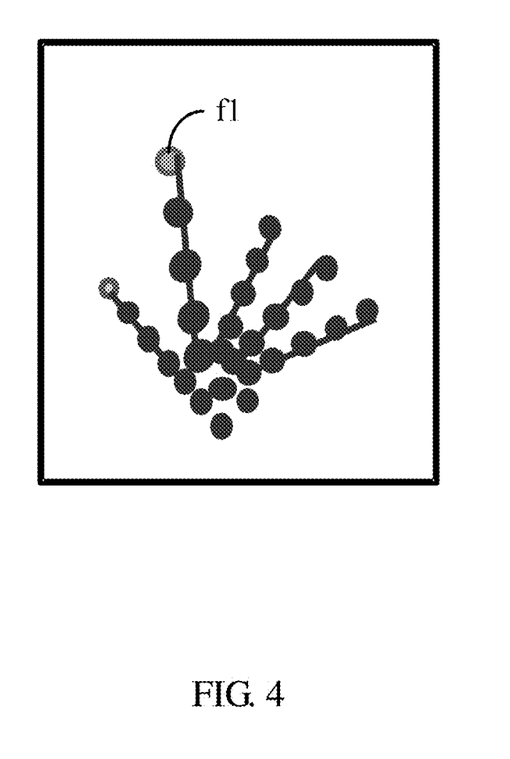
FIG. 4 is a schematic diagram of one embodiment of recognizing a palm of a user when the user uses a palm to touch a touch screen of the mobile electronic device.

Referring to FIG. 4, the initializing module 201 can obtain multiple coordinates of the touch screen 21 that the user's palm touches, wherein the coordinates are of the form ($X_n$, $Y_n$), n=1, 2, 3, 4, . . . n. A palm recognition method is used for recognizing the user's palm on the touch screen 21. When the initializing module 201 recognizes the palm of the user on the touch screen 21, a coordinate f1 of the index finger is obtained and set as initial coordinates.

Figure 5:
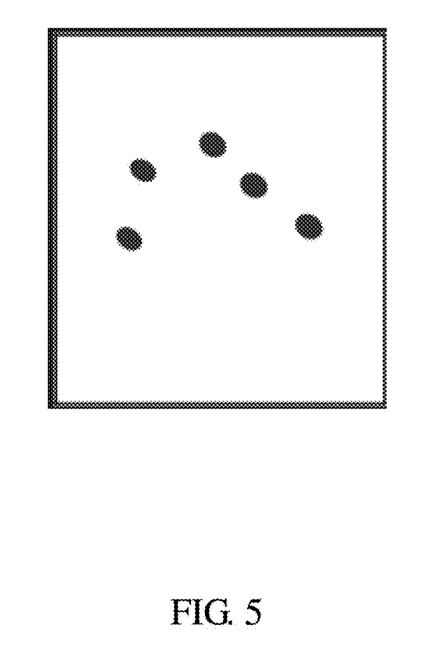
FIG. 5 is a schematic diagram of an embodiment of recognizing five touch points of five fingers of the user touching the touch screen of the mobile electronic device.

Referring to FIG. 5, the initial operation can also be five fingertips of the user touching the touch screen 21. When the initializing module 201 detects five touch points on the touch screen 21, a second touch point from the left can be recognized as a touch point of the index finger, and coordinates of the second touch point are set as the initial coordinates. In another embodiment, the initial operation can be performed by any other controlling object touching the touch screen 21, such as a touch operation of a stylus exceeding a predetermined time duration.

In step S2, the initializing module 201 transmits the initial coordinates to the setting module 111 of the display device 100, and initializes a display position of a cursor on the display device 100.

In step S3, the setting module 111 positions the cursor according to the initial coordinates transmitted by the initializing module 201, and sets initial three-dimensional coordinates of the user's index finger.

Figure 6:
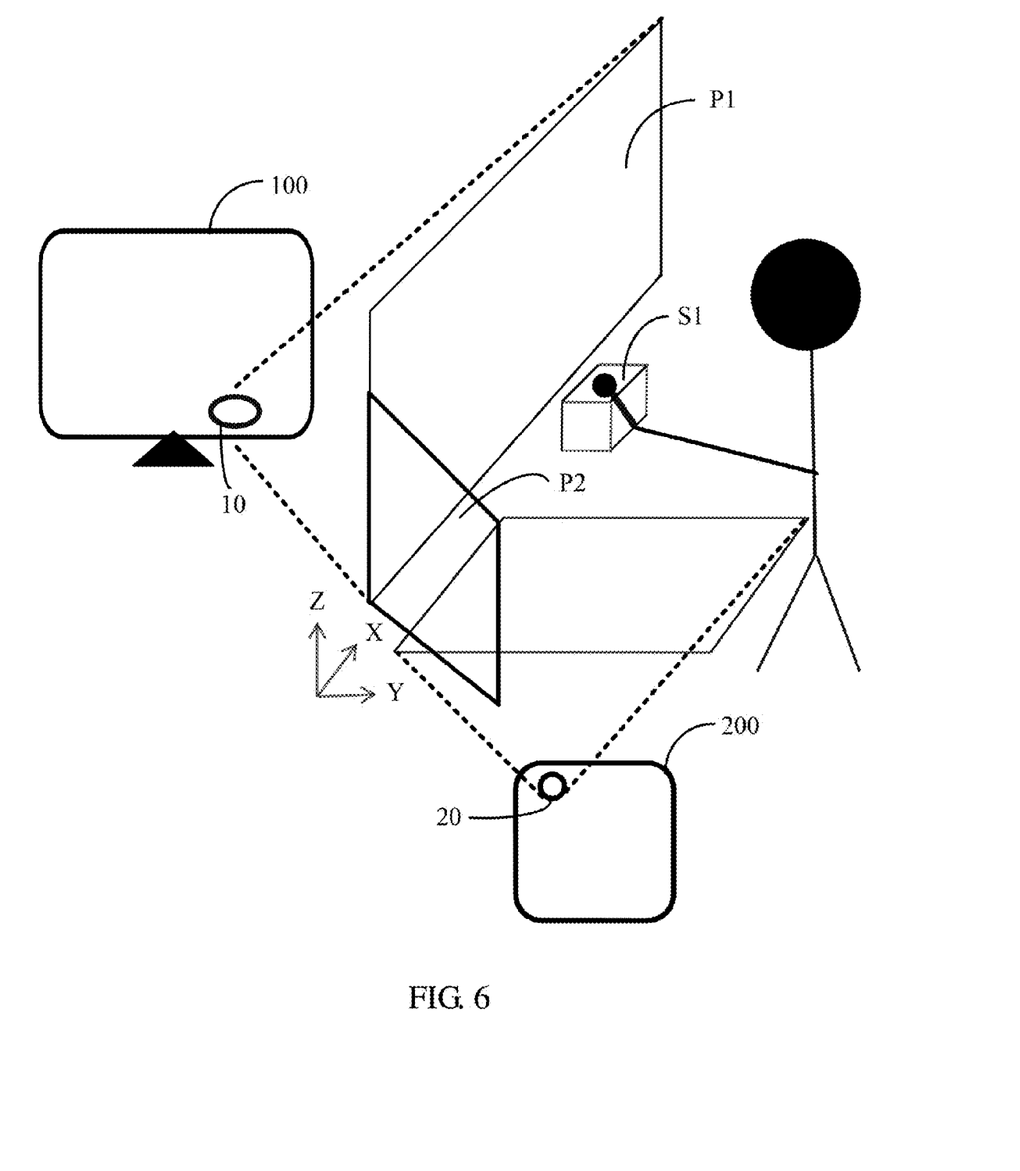
FIG. 6 is a schematic diagram of one embodiment of creating a three-dimensional coordinate system.

Specifically, referring to FIG. 6, the initial three-dimensional coordinates are coordinate values of the index finger when the index finger is in a specific three-dimensional space S1. Further, the initial three-dimensional coordinates of the index finger correspond to a particular point (e.g., fingertip) in the three-dimensional space S1. The three-dimensional space S1 is cooperatively formed by a first two-dimensional plane P1 and a second two-dimensional plane P2.

The first two-dimensional plane P1 is an XZ plane in a field of view of the first shooting module 10 of the display device 100, and the second two-dimensional plane P2 is a YZ plane in a field of view of the second shooting module 20 of the mobile electronic device 200. The first two-dimensional plane P1 and the second two-dimensional plane P2 cooperatively form an XYZ coordinate system (i.e., the three-dimensional space S1). When the user's index finger moves in the three-dimensional space S1, the first shooting module 10 of the display device 100 can obtain the coordinates of the index finger moving in the first two-dimensional space P1, and the second shooting module 20 of the mobile electronic device 200 can obtain the coordinates of the index finger moving in the second two-dimensional space P2.

Because the initial coordinates (X0, Y0) are obtained when the user touches the touch screen 21, a coordinate of the Z-axis is set as 0, so the initial three-dimensional coordinates are (X0, Y0, Z0).

In step S4, the first detection module 112 detects movement information of the index finger in the first two-dimensional plane P1 by the first shooting module 10. The movement information of the index finger in the first two-dimensional space comprises movement direction and movement distance of the index finger, such as movement along the X-axis and the Z-axis.

Specifically, the first detection module 112 controls the first shooting module 10 to obtain real-time images of the user's finger, and analyzes the real-time images to detect the movement information of the index finger in the first two-dimensional space. For example, the first detection module 112 uses dynamic object detection techniques for determining the movement information of the index finger in the first two-dimensional space according to position information of the index finger in the real-time images.

In step S5, the second detection module 202 detects movement information of the index finger in the second two-dimensional plane P2 by the second shooting module 20, and transmits the movement information of the index finger to the control module 113 of the display device 100. The movement information of the index finger in the second two-dimensional space comprises movement direction and movement distance of the index finger in the second two-dimensional space. The method of the second detection module 202 detecting the movement information of the index finger in the second two-dimensional space is substantially similar to the method of the first detection module 112 detecting the movement information of the index finger in the first two-dimensional space.

In step S6, the control module 113 obtains current three-dimensional coordinates of the index finger according to the movement information of the index finger in the first two-dimensional space, the movement information of the index finger in the second two-dimensional space, and the initial three-dimensional coordinates of the index finger. After the current three-dimensional coordinates of the index finger are obtained, the setting module 113 updates the initial three-dimensional coordinates to the current three-dimensional coordinates, so that three-dimensional coordinates of the index finger can be obtained when the index finger moves a next time.

Figure 7:
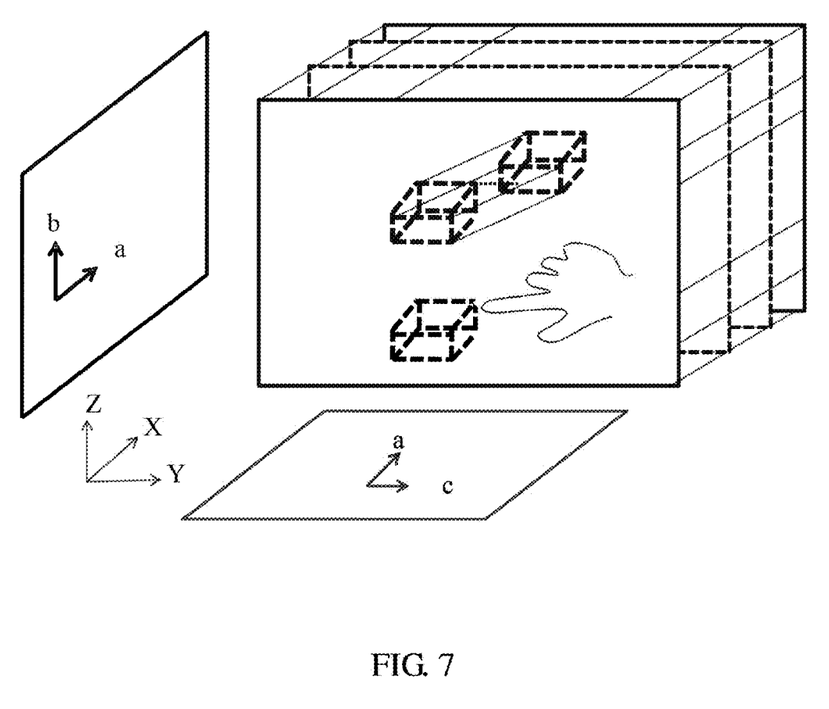
FIG. 7 is a schematic diagram of one embodiment of a finger of the user moving in the three-dimensional coordinate system.

Referring to FIG. 7, the first detection module 112 of the display device 100 detects a movement direction A and a movement direction B of the index finger corresponding to movement along the X-axis and Z-axis, respectively. The second detection module 202 of the mobile electronic device 200 detects a movement direction C and the movement direction A of the index finger corresponding to movement along the Y-axis and X-axis. Furthermore, the control module 113 can obtain the movement information of the index finger in the three-dimensional space according to the movement distance along the movement directions A, B, and C, and according to the initial three-dimensional coordinates of the index finger.

In one embodiment, the control module 113 can control the cursor of the display device 100 to move according to the current three-dimensional coordinates of the index finger so that a display menu of the display device 100 can be operated. Furthermore, according to movements of the index finger, the display device 100 can be controlled to perform operations. In one embodiment, referring to FIG. 8, if the movement distance of the index finger along one predetermined direction exceeds a threshold distance S (e.g. 10 cm), the display device 100 will perform a predetermined operation, such as clicking the cursor.

Figure 8:
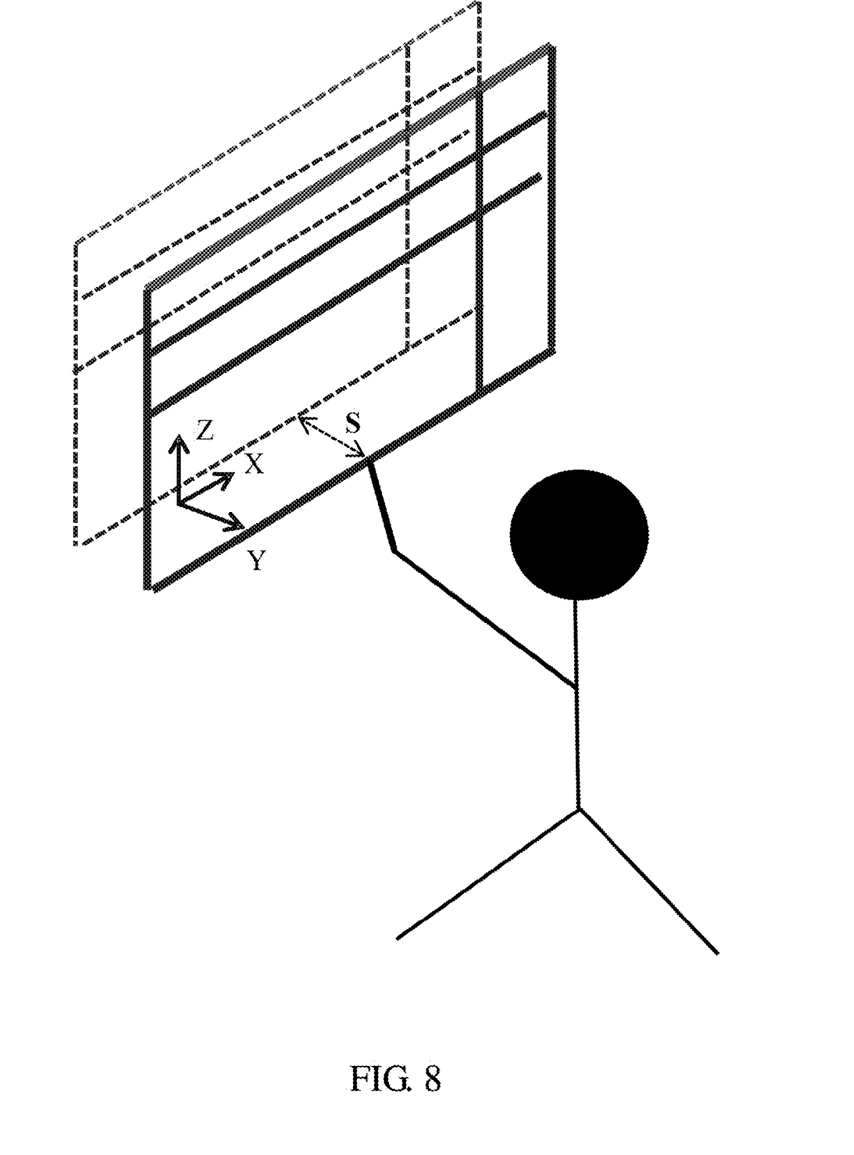
FIG. 8 is a schematic diagram of one embodiment of detecting a movement distance of a finger of the user.

In another embodiment, when the movement distance of the index finger along the X-axis is greater than S, the display device 100 will open a text input interface to allow the user to input text via the mobile electronic device 200, and the mobile electronic device 200 transmits the text input by the user to the text input interface of the display device 100 to display the text.

Figure 9:
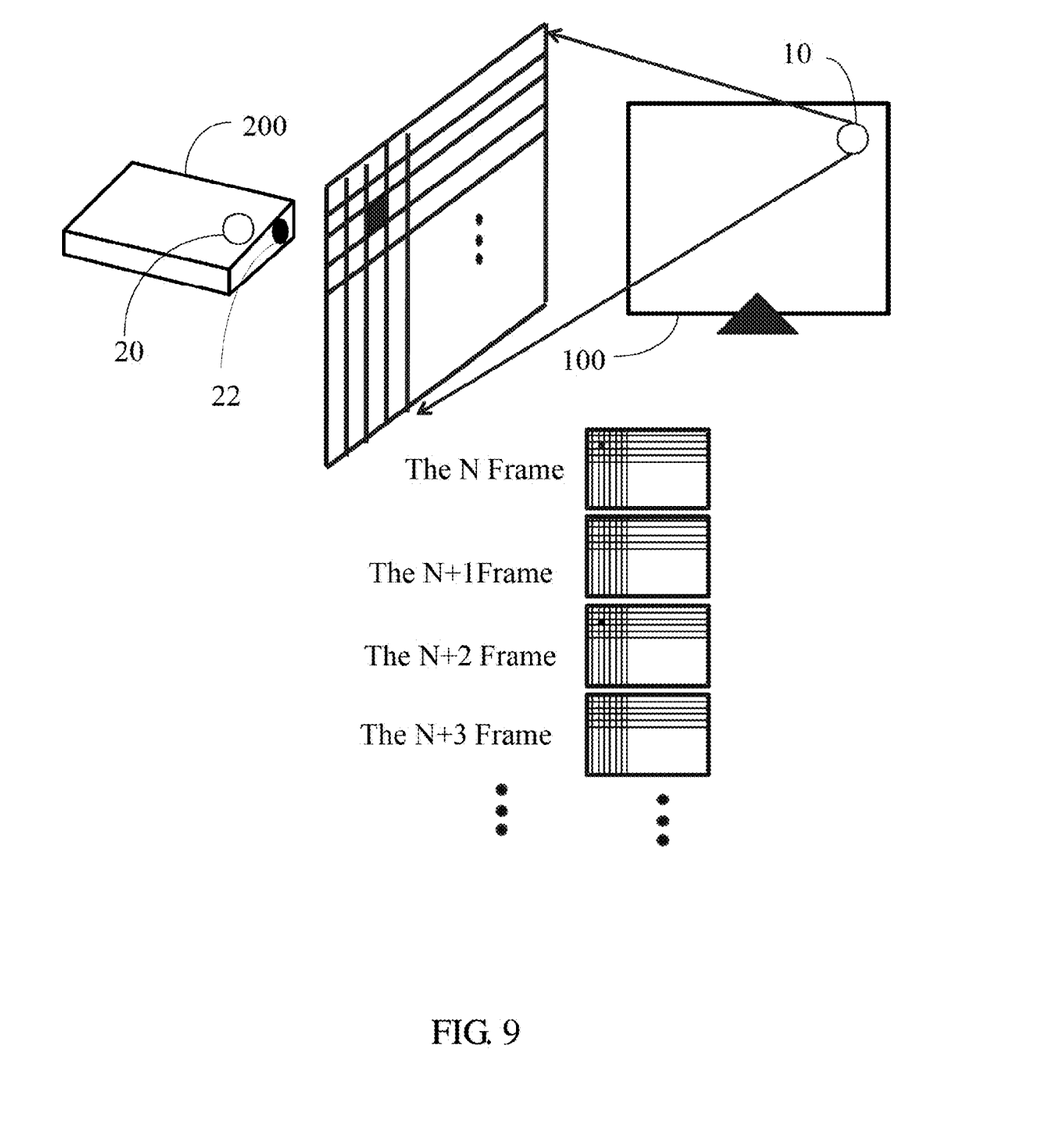
FIG. 9 is a schematic diagram of another embodiment of determining initial two-dimensional coordinates of the index finger

In another embodiment, a method for confirming the initial coordinates (X0, Y0) can be provided. Referring to FIG. 9, the mobile electronic device 200 further comprises a Light-Emitting Diode (LED) 22 adjacent to the second shooting module 20. The LED 22 can emit a light signal. Successive images (such as an N frame, N+1 frame, N+2 frame, . . . ) captured by the first shooting module 10 of the display device 100 comprise the light signal. Assuming that the coordinates of a touch point of the index finger on the touch screen 21 of the mobile electronic device 200 are coordinates (X1, Y1), the mobile electronic device 200 determines that the distance between the touch point and the light signal is a distance ($\Delta a0$, $\Delta b0$), wherein $\Delta a0$ is the distance between the initial coordinate X0 and the light signal, and Δb0 is the distance between the initial coordinate Y0 and the light signal.

Figure 10:
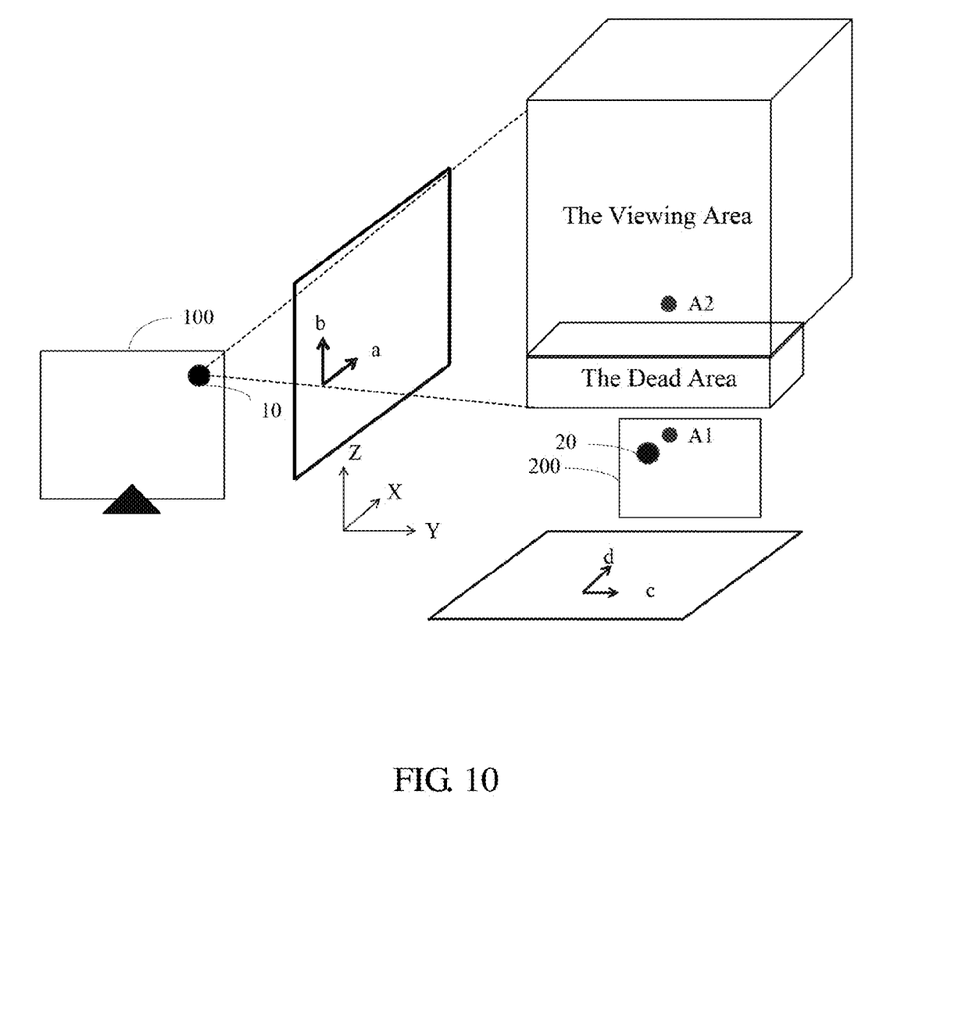
FIG. 10 is a schematic diagram of another embodiment of determining three-dimensional coordinates of the index finger.

In another method for confirming the initial coordinates, referring to FIG. 10, a shooting angle of the second shooting module 20 of the mobile electronic device 200 is limited. If the index finger is too close to the second shooting module 20 or the angle is too large, the movement of the index finger cannot be detected. Therefore, a dead area, which can only be captured by the first shooting module 10, exists. Considering this problem, the following method can confirm the initial coordinates to reduce the dead area.

When the index finger is in the dead area and touches the touch screen 21, the first shooting module 10 of the display device 100 captures an initial touch point A1 of the index finger, and an initial coordinate, such as (X0, Z0) of the index finger in the first two-dimensional space, is obtained. When the index finger moves into a viewing area (such as movement from a position A1 to a position A2), the second shooting module 20 can capture the index finger and obtain the initial coordinate of the index finger in the second two-dimensional space, such as (c0, d0). According to the coordinates (a0, b0) and (c0, d0), the initial coordinate of the index finger in the three-dimensional space is (X0, Y0, Z0).

The foregoing disclosure of the various embodiments has been presented for purposes of illustration and description. It is not intended to be exhaustive or to limit the invention to the precise forms disclosed. Many variations and modifications of the embodiments described herein will be apparent to one of ordinary skill in the art in the light of the above disclosure. The scope of the invention is to be defined only by the claims appended hereto and their equivalents.

What is claimed is:

1. A system of controlling a display device comprising:
a first shooting module and a second shooting module, the modules shooting images located at different positions;
a touch screen;
a processor; and
a storage system storing one or more software programs in the form of computerized codes operable to be executed by the processor, the one or more software programs comprising:
an initializing module detecting an initialization operation on the touch screen to obtain a coordinate of a touch point of a control object on the touch screen as an initial coordinate in a first two-dimensional space, wherein the initialization operation is a multi-touch operation, or a touch operation exceeding a predetermined time duration;
a setting module setting an initial three-dimensional coordinate of the control object in a three-dimensional space based on the initial coordinate, wherein the three-dimensional space is cooperatively formed by the first two-dimensional space and a second two-dimensional space;
a first detection module detecting movement information of the control object in the first two-dimensional space according to an image obtained by the first shooting module, wherein the movement information of the control object in the first two-dimensional space comprises a movement direction and a movement distance of the control object in the first two-dimensional space;
a second detection module detecting movement information of the control object in the second two-dimensional space according to an image obtained by the second shooting module, wherein the movement information of the control object in the second two-dimensional space comprises a movement direction and a movement distance of the control object in the second two-dimensional space;
a control module calculating a current three-dimensional coordinate of the control object according to the movement information of the control object in the first two-dimensional space, the movement information of the control object in the second two-dimensional space and the initial three-dimensional coordinate of the control object, and controlling the display device to perform an action corresponding to the current three-dimensional coordinate of the control object; and
the setting module further updating the initial three-dimensional coordinate of the control object to the current three-dimensional coordinate of the control object.

2. The system of controlling the display device of claim 1, wherein the setting module sets an initial three-dimensional coordinate of the control object according to the initial coordinate obtained by the initializing module and the control module further controls the display device to show a cursor at an initial location of the cursor according to the initial three-dimensional coordinate of the control object.

3. The system of controlling the display device of claim 2, wherein the control module further controls the display device to move the cursor according to the current three-dimensional coordinate of the control object.

4. The system of controlling the display device of claim 1, wherein the control module further controls the display device to perform a preset operation when the movement distance of the control object exceeds a threshold in a preset movement direction.

5. A method of controlling a display device, the display device connected to a mobile electronic device, the display device comprising a first shooting module and the mobile electronic device comprising a second shooting module and a touch screen, wherein the method comprises:
the mobile electronic device detecting an initialization operation on the touch screen of a control object to obtain a coordinate of a touch point of the control object on the touch screen as an initial coordinate in a first two-dimensional space, wherein the initialization operation is a multi-touch operation, or a touch operation exceeding a predetermined time duration;
the display device setting an initial three-dimensional coordinate of the control object in a three-dimensional space based on the initial coordinate, the three-dimensional space is cooperatively formed by the first two-dimensional space and a second two-dimensional space;
the display device determining movement information of the control object in the first two-dimensional space according to an image obtained by the first shooting module, wherein the movement information of the control object in the first two-dimensional space comprises a movement direction and a movement distance of the control object in the first two-dimensional space;
the mobile electronic device determining movement information of the control object in the second two-dimensional space according to an image obtained by the second shooting module, wherein the movement information of the control object in the second two-dimensional space comprises movement direction and movement distance of the control object in the second two-dimensional space;
the display device calculating a current three-dimensional coordinate of the control object according to the movement information of the control object in the first two-dimensional space, the movement information of the control object in the second two-dimensional space and the initial three-dimensional coordinate of the control object, and perform an action corresponding to the current three-dimensional coordinate of the control object; and the display device updating the initial three-dimensional coordinate of the control object to the current three-dimensional coordinate of the control object.

6. The method of controlling the display device of claim 5, further comprising:

the display device setting an initial three-dimensional coordinate of the control object according to the initial coordinate transmitted by the mobile electronic device, and the control module controlling the display device to show a cursor at an initial location of the cursor according to the initial three-dimensional coordinates of the control object.

7. The method of controlling the display device of claim 6, wherein the method further comprises:

the display device moving the cursor according to the current three-dimensional coordinate of the control object.

8. The method of controlling the display device of claim 5, further comprising:

the display device performing a preset operation when the movement distance of the control object exceeds a threshold in a preset movement direction.

9. A display device, connected to a mobile electronic device, the display device comprises a first shooting module, the mobile electronic device comprising a second shooting module and a touch screen, the display device further comprising:

a setting module, setting an initial three-dimensional coordinate of a control object in a three-dimensional space, the three-dimensional space is cooperatively formed by the first two-dimensional space and a second two-dimensional space, and in the event that the mobile electronic device detects an initialization operation on the touch screen of the control object obtaining a coordinate of a touch point of the control object on the touch screen as an initial coordinate, wherein the initialization operation is a multi-touch operation, or a touch operation exceeding a predetermined time duration;

a first detection module detecting movement information of the control object in the first two-dimensional space according to an image obtained by the first shooting module, wherein the movement information of the control object in the first two-dimensional space comprises a movement direction and a movement distance of the control object in the first two-dimensional space;

a control module calculating a current three-dimensional coordinate of the control object according to the movement information of the control object in the first two-dimensional space, a movement information of the control object in the second two-dimensional space and the initial three-dimensional coordinates of the control object, and controlling a display device to perform an action corresponding to the current three-dimensional coordinate of the control object, wherein the mobile electronic device determines the movement information of the control object in the second two-dimensional space according to an image obtained by the second shooting module and transmits the movement information of the control object in the second two-dimensional space to the control module; and the setting module further updating the initial three-dimensional coordinate of the control object to the current three-dimensional coordinate of the control object.

\* \* \* \* \*